(12) United States Patent
Wynn et al.

(10) Patent No.: US 11,888,335 B1
(45) Date of Patent: Jan. 30, 2024

(54) BATTERY INRUSH AND OUTRUSH CURRENT LIMITING

(71) Applicant: Ampaire, Inc., Hawthorne, CA (US)

(72) Inventors: Nathaniel C. Wynn, Murrieta, CA (US); Russell Newman, Murrieta, CA (US); Arindam Chatterji, Murrieta, CA (US)

(73) Assignee: Ampaire, Inc., Hawthorne, CA (US)

( * ) Notice: Subject to any disclaimer, the term of this patent is extended or adjusted under 35 U.S.C. 154(b) by 0 days.

(21) Appl. No.: 17/893,938

(22) Filed: Aug. 23, 2022

(51) Int. Cl.
*H02J 7/00* (2006.01)

(52) U.S. Cl.
CPC ........ *H02J 7/00304* (2020.01); *H02J 7/0031* (2013.01)

(58) Field of Classification Search
CPC .................................................. H02J 7/00304
USPC .......................................................... 320/134
See application file for complete search history.

(56) References Cited

U.S. PATENT DOCUMENTS

| | | | |
|---|---|---|---|
| 3,643,334 A | 2/1972 | Gelb et al. | |
| 9,018,912 B2 | 4/2015 | Burstein et al. | |
| 10,944,279 B1 | 3/2021 | Chen et al. | |
| 2016/0126766 A1 | 5/2016 | Zhang et al. | |
| 2017/0133837 A1* | 5/2017 | Hasan ..................... | H02H 9/001 |
| 2018/0272870 A1* | 9/2018 | Burkman .............. | B60L 3/0046 |
| 2018/0323608 A1* | 11/2018 | Valdivia Guerrero ....................... | H02H 9/002 |
| 2020/0195127 A1* | 6/2020 | Garbossa ................ | H02M 1/08 |
| 2022/0200437 A1* | 6/2022 | Lin .......................... | H02M 1/32 |
| 2022/0247167 A1* | 8/2022 | Song ..................... | H02H 9/002 |

\* cited by examiner

*Primary Examiner* — Yalkew Fantu
(74) *Attorney, Agent, or Firm* — Sheppard Mullin Richter & Hampton LLP

(57) ABSTRACT

In general, one aspect disclosed features an apparatus, comprising: a battery; a resistive load; a switch comprising a first transistor and a second transistor; a resistor; an inductor; and a control circuit; wherein the switch, the resistor, and the inductor are coupled in series between the battery and the resistive load; and wherein the control circuit controls the switch based on a voltage across the resistor. In general, another aspect disclosed features an apparatus, comprising: a battery; a resistive load; a switch; a resistor; an inductor; and a control circuit; wherein the switch, the resistor, and the inductor are coupled in series between the battery and the resistive load; and wherein the control circuit controls the switch based on a voltage across the resistor.

20 Claims, 5 Drawing Sheets

BATTERY INRUSH AND OUTRUSH CURRENT LIMITING

DESCRIPTION OF RELATED ART

The disclosed technology relates generally to battery technologies, and more particularly some embodiments relate to current limiting in such technologies.

SUMMARY

In general, one aspect disclosed features an apparatus, comprising: a battery; a resistive load; a switch comprising a first transistor and a second transistor; a resistor; an inductor; and a control circuit; wherein the switch, the resistor, and the inductor are coupled in series between the battery and the resistive load; and wherein the control circuit controls the switch based on a voltage across the resistor.

Embodiments of the apparatus may include one or more of the following features. In some embodiments, the first transistor is a first MOSFET; and the second transistor is a second MOSFET. In some embodiments, a drain of the first MOSFET is electrically coupled to a drain of the second MOSFET; a gate of the first MOSFET is electrically coupled to a gate of the second MOSFET; and the gates of the first and second MOSFETs are electrically coupled to an output of the control circuit. In some embodiments, the control circuit opens the switch when the voltage across the resistor exceeds a predetermined reference voltage; and the control circuit closes the switch when the voltage across the resistor does not exceed the predetermined reference voltage. In some embodiments, the control circuit opens the switch when the voltage across the resistor exceeds a predetermined reference voltage and an enable signal is asserted; and the control circuit closes the switch when the voltage across the resistor does not exceed the predetermined reference voltage and the enable signal is asserted. Some embodiments comprise a diode having an input electrically coupled to ground and an output electrically coupled to a node between the switch and the inductor.

In general, one aspect disclosed features an apparatus, comprising: a battery; a resistive load; a switch; a resistor; an inductor; and a control circuit; wherein the switch, the resistor, and the inductor are coupled in series between the battery and the resistive load; and wherein the control circuit controls the switch based on a voltage across the resistor.

Embodiments of the apparatus may include one or more of the following features. In some embodiments, the first transistor is a first MOSFET; and the second transistor is a second MOSFET. In some embodiments, a gate of the MOSFET is electrically coupled to an output of the control circuit. In some embodiments, the control circuit opens the switch when the voltage across the resistor exceeds a predetermined reference voltage; and the control circuit closes the switch when the voltage across the resistor does not exceed the predetermined reference voltage. In some embodiments, the control circuit opens the switch when the voltage across the resistor exceeds a predetermined reference voltage and an enable signal is asserted; and the control circuit closes the switch when the voltage across the resistor does not exceed the predetermined reference voltage and the enable signal is asserted. Some embodiments comprise a diode having an input electrically coupled to ground and an output electrically coupled to a node between the switch and the inductor.

In general, one aspect disclosed features an apparatus, comprising: a battery; a resistive load; a first switch; a second switch; a resistor; an inductor; and a control circuit; wherein the first and second switches, the resistor, and the inductor are coupled in series between the battery and the resistive load; wherein the resistor and the inductor are coupled in series between the first and second switches; and wherein the control circuit controls the first and second switches based on a voltage across the resistor.

Embodiments of the apparatus may include one or more of the following features. In some embodiments, the first switch is a first MOSFET; and the second switch is a second MOSFET. In some embodiments, a gate of the first MOSFET is electrically coupled to a first output of the control circuit; and a gate of the second MOSFET is electrically coupled to a second output of the control circuit. In some embodiments, the control circuit opens the first switch when the voltage across the resistor exceeds a predetermined reference voltage; and the control circuit closes the first switch when the voltage across the resistor does not exceed the predetermined reference voltage. In some embodiments, the control circuit opens the first switch when the voltage across the resistor exceeds a predetermined reference voltage and a discharge enable signal is asserted; and the control circuit closes the first switch when the voltage across the resistor does not exceed the predetermined reference voltage and a discharge enable signal is negated. In some embodiments, the control circuit opens the second switch when the voltage across the resistor exceeds a predetermined reference voltage; and the control circuit closes the second switch when the voltage across the resistor does not exceed the predetermined reference voltage. In some embodiments, the control circuit opens the second switch when the voltage across the resistor exceeds a predetermined reference voltage and a discharge enable signal is asserted; and the control circuit closes the second switch when the voltage across the resistor does not exceed the predetermined reference voltage and a discharge enable signal is negated. Some embodiments comprise a first diode having an input electrically coupled to ground and an output electrically coupled to a node between the first switch and the inductor; and a second diode having an input electrically coupled to ground and an output electrically coupled to a node between the second switch and the inductor.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Electric vehicles generally include a high-voltage battery and a load in the form of an electric motor. The load generally has some capacitance. For example, the electric motor may have an inverter that has substantial capacitance. Without some sort of current limiting circuit, this capacitance may allow for substantial inrush and outrush currents at the battery. Unchecked, these currents may be in the hundreds or thousands of amps. When the system is fused, these currents will trip the fuse, disabling the system. When unfused, these currents will cause catastrophic damage to the batteries and other components of the system.

Figure 1:
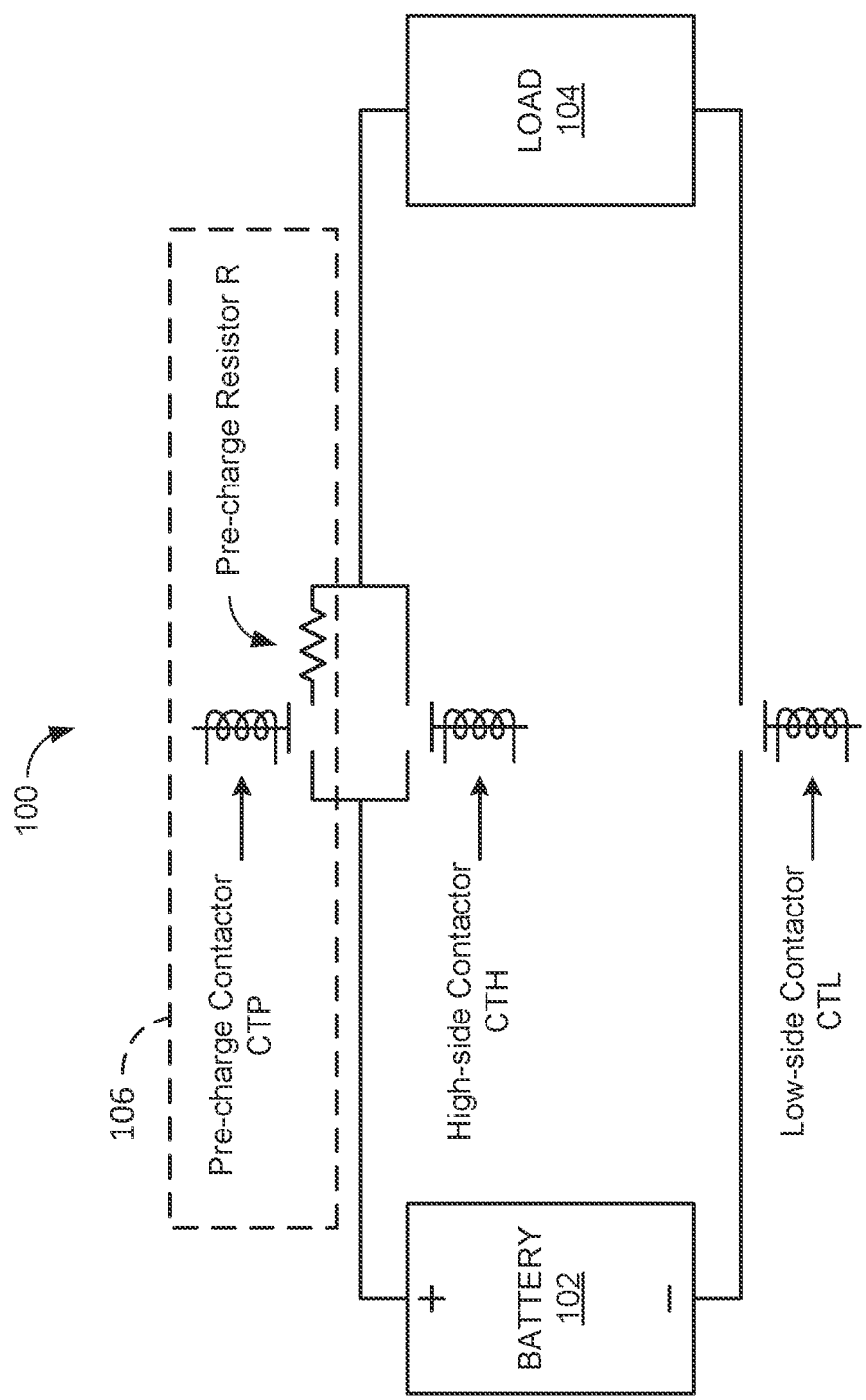
FIG. 1 is a circuit block diagram of a conventional system for limiting discharge currents.

FIG. 1 is a circuit block diagram of a conventional system 100 for limiting discharge currents. Referring to FIG. 1, the system 100 includes a battery 102, a load 104, a high-side contactor CTH electrically coupled between a positive terminal of the battery 102 and the load 104, and a pre-charge circuit 106 electrically coupled in parallel with the high-side contactor CTH. The pre-charge circuit 106 includes a pre-charge contactor CTP electrically coupled in series with a pre-charge resistor R. The system may also include a low-side contactor CTL electrically coupled between a negative terminal of the battery 102 and the load 104.

Prior to charging the load 104, the system 100 may pre-charge the pre-charge circuit 106. During pre-charge, the high-side contactor CTH may be open, the low-side contactor CTL may be closed, and the pre-charge contactor CTP may be closed. The pre-charge resistor R is selected to pre-charge the bus quickly, but not so quickly as to cause the pre-charge contactor CTP to fail. For example, the pre-charge resistor R may be selected to pre-charge the bus in the range of one to five seconds. The resistance of the pre-charge resistor R and the capacitance of the load 104 limit the current flowing to the load 104 during pre-charge. The resistance of the pre-charge resistor R may be around 50 ohms, or by way of example, between 45-55 ohms. The capacitance of the load 104 may generally be in the range of 700-900 microfarad range.

When the voltage across the load 104 and the battery voltage are roughly the same, the current drawn through the pre-charge circuit 106 may approach zero. Then the high-side contactor CTH maybe closed and the pre-charge contactor CTP may be opened. The system 100 is then operational.

This approach has several disadvantages. The contactors may fail, for example by exploding or by being welded shut. The pre-charge resistor R may fail. Furthermore, this approach involves significant cost and complexity for little value. It cannot effectively be used as a fuse because it won't load share with the high-side contactor.

With independent switched controls, e.g. a high-side or low-side contactor, full-voltage battery modules in parallel can ensure system function, albeit at reduced performance, if a single module encounters some sort of failure. However, should such switching not be present, a failure may cause a significant performance loss. For example, the loss of a single battery cell in a single parallel group would cause a severe reduction in the power capacity.

Nominally-identical cells will have very similar impedances, and the impedance scales roughly linearly with capacity for a given state of charge. As such, no matter how many cells are placed directly in parallel, they will current balance amongst themselves very evenly. Should these cells then be placed in series with another nominally-identical parallel group, all cells in the system will see approximately the same current at any given moment in time.

If half of the cells in one parallel group encounter a fault and disconnect from the electrical circuit, the remaining cells in that parallel group will encounter approximately twice the voltage sag under a given load, and will limit the dynamic power performance of the system by around 50%. Since that parallel group also requires half as much capacity to go from maximum to minimum state of charge, the total capacity of the system has effectively been reduced by 50%. The basic battery monitoring system algorithms to use dynamic voltage limits and voltage-determined state of charge limits are very well discussed and thoroughly understood by the industry.

With multiple full-voltage strings in parallel, each with multiple cells in each parallel group, the loss of half of the cells from a single parallel group has a relatively small impact on the resistance of the collective string; as such, that string will deliver approximately the same amount of current as each of the other strings under a given load. As a result, the state of charge of the damaged parallel group within that string will be lower when the load is reduced, resulting in a lower string voltage and a potentially massive inrush current from other strings—to balance the voltage of all of these strings in parallel—that is trivially capable of causing a thermal runaway event. As such, without a current limiter of some sort, if one of several full-voltage modules has a reduced-capacity parallel group, the only safe choice is to disconnect the entire string.

Figure 2:
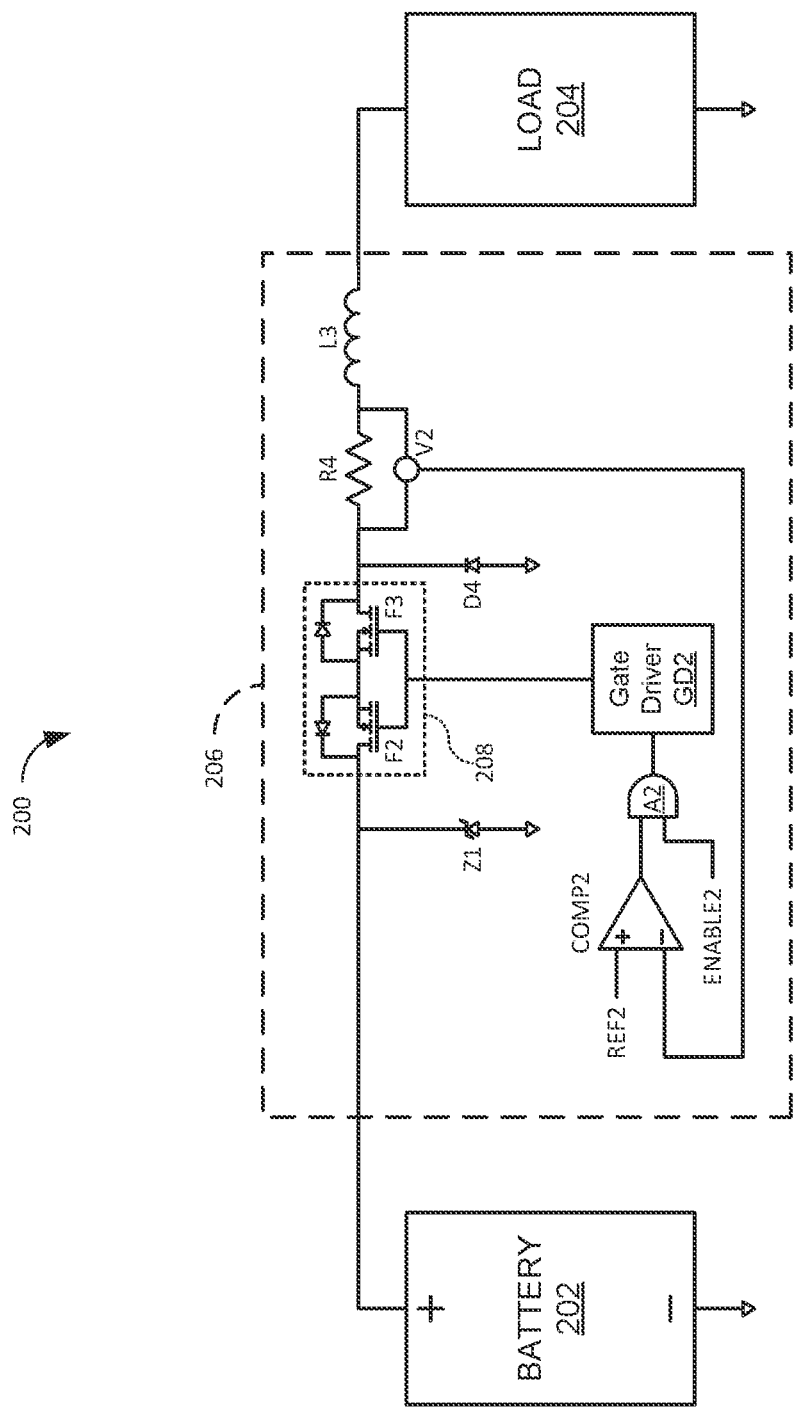
FIG. 2 is a circuit block diagram of a system for limiting outrush currents from a battery during battery discharge according to some embodiments of the disclosed technologies.

FIG. 2 is a circuit block diagram of a system 200 for limiting outrush currents from a battery during battery discharge according to some embodiments of the disclosed technologies. Battery discharge may occur when the voltage across the battery exceeds the voltage across the load.

Referring to FIG. 2, the system 200 may include one or more of a battery 202, a load 204, and/or a discharge current limiter 206 electrically coupled between a positive terminal of the battery 202 and the load 204. The discharge current limiter 206 may include one or more of an inductor L3, a resistor R4, and/or a switch 208 electrically coupled in series.

In the depicted embodiment, the switch 208 may be implemented as two power MOSFETs F2 and F3. Power FETs have a body diode characteristic, illustrated as body diodes for the MOSFETs F2 and F3 in FIG. 2. When the MOSFETs F2 and F3 are arranged as shown in FIG. 2, this characteristic allows currents to be blocked in both directions. The drains of the MOSFETs F2 and F3 may be electrically coupled together. The gates of the MOSFETs F2 and F3 may be electrically coupled together, and may be driven by a gate driver GD2.

Other circuits may be used to implement the switch 208. However, a slow switch will require a larger inductor L3 to sufficiently reduce ripple. The use of high-speed switches such as the MOSFETs F2 and F3 allows for the use of a smaller inductor L3. The MOSFETs F2 and F3 may be implemented as NMOS, with the body terminal tied to the source to avoid large transient voltages; i.e., the body and drain form a diode connection. The MOSFETs F2 and F3 may be implemented as silicon carbide, gallium nitride, or similar materials.

A snubber diode Z1 may be electrically coupled between the positive terminal of the battery 202 and ground for overvoltage suppression. The snubber diode Z1 may be implemented as a Zener diode. A freewheel diode D4 may be electrically coupled between ground and a node between the switch 208 and the resistor R4.

A voltage sensor V2 may sense a voltage across the resistor R4. A comparator COMP2 may compare that voltage V2 with a reference voltage REF2. The comparator COMP2 may output a logic high ("1") when the voltage V2 is less than the reference voltage REF2, and a logic low ("0") otherwise. An AND gate A2 may trigger the gate driver GD2 to drive the gates of the MOSFETs F2 and F3 when voltage V2 is less than the reference voltage REF2 and an enable signal ENABLE2 is asserted, thereby turning the switch 208 on.

When a current across the inductor L3 to the load 204 is too high, the voltage V2 across the sense resistor R4 may exceed the reference voltage REF2, and the gate driver GD2 may turn off the switch 208, thereby interrupting the current provided by the battery 202 to the inductor L3, which may continue to supply a diminishing level of current to the load 204, with the current flowing through the freewheel diode D4 and the resistor R4. When the current through the inductor L3 is sufficiently low, the voltage V2 across the resistor R4 may fall below the reference voltage REF2. In response, if the discharge current limiter 206 is enabled (i.e., the enable signal ENABLE2 is asserted), the gate driver GD2 may turn on the switch 208, again supplying current from the battery 202 to the load 204.

Figure 3:
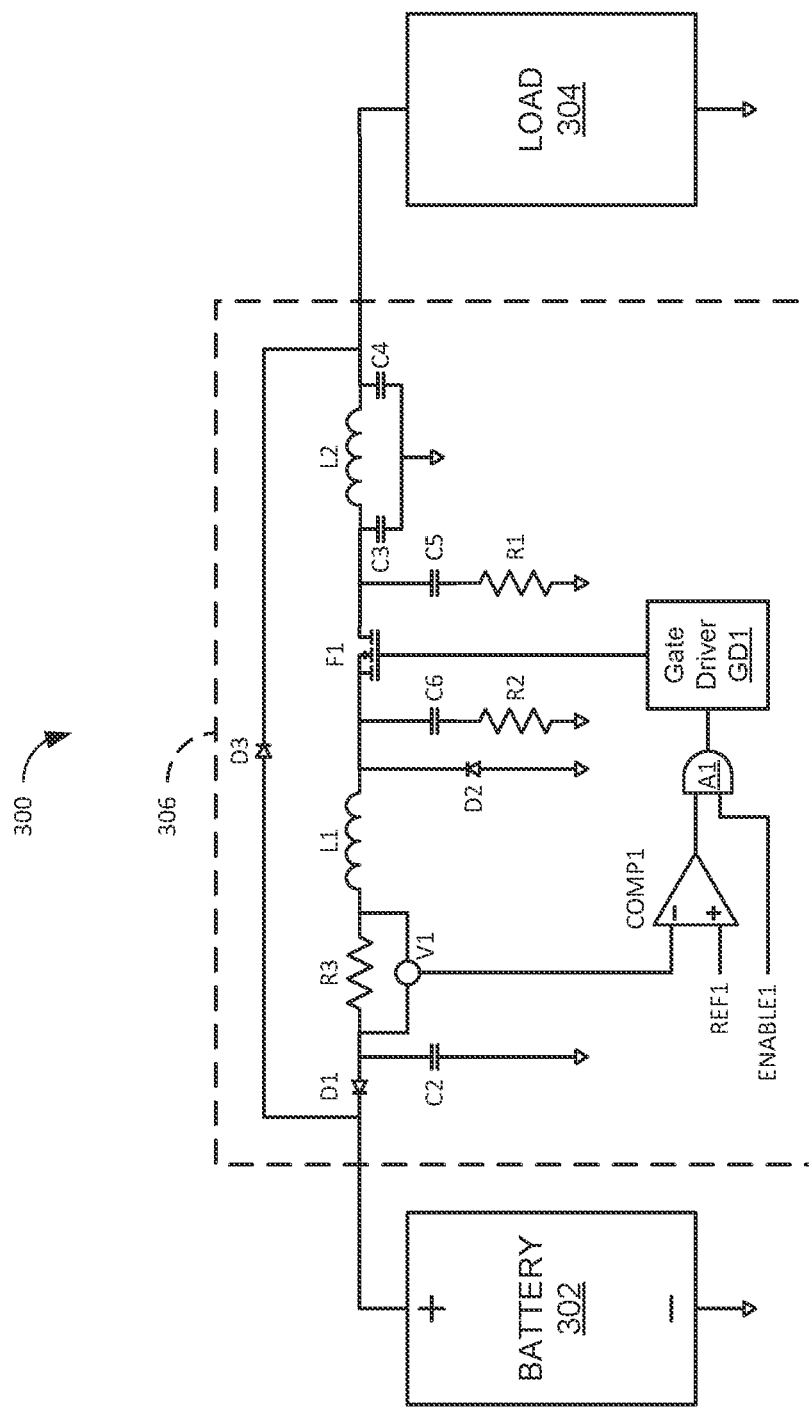
FIG. 3 is a circuit block diagram of a system for limiting inrush currents into a battery during battery charge according to some embodiments of the disclosed technologies.

FIG. 3 is a circuit block diagram of a system 300 for limiting inrush currents into a battery during battery charge according to some embodiments of the disclosed technologies. Battery charge may occur when the voltage across the load exceeds the voltage across the battery. Referring to FIG. 3, the system 300 may include a battery 302, a load 304, and a charge current limiter 306 electrically coupled between a positive terminal of the battery 302 and the load 304. The charge current limiter 306 may include a diode D1, a resistor R3, an inductor L1, a switch F1, and an inductor L2, electrically coupled in series.

The switch F1 may be implemented as a MOSFET. The MOSFET F1 may be implemented as NMOS with the body terminal tied to the source to avoid large transient voltages. The MOSFET F1 may be implemented as silicon carbide, gallium nitride, or similar materials.

The discharge current limiter 306 may include a freewheel diode D2 and a bypass diode D3. The discharge current limiter 306 may include additional elements for filtering the current. For example, the charge current limiter 306 may include capacitor C2, capacitor C6 and resistor R2, capacitor C5 and resistor R1, and/or inductor L2 and capacitors C3 and C4, which may be connected as shown in FIG. 3.

A voltage sensor V1 may sense a voltage across the resistor R1. A comparator COMP1 may compare that voltage V1 with a reference voltage REF1. The comparator COMP1 may output a logic low when the voltage V1 exceeds the reference voltage REF1, and a logic high otherwise. An AND gate A1 may trigger the gate driver GD1 to drive the gate of the MOSFET F4 when voltage V1 is less than the reference voltage REF1 and an enable signal ENABLE1 is asserted, thereby turning the MOSFET F1 on.

When a current flowing across the inductor L2 to the battery 302 is too high, the voltage V1 across the sense resistor R3 may exceed the reference voltage REF1, and the gate driver GD1 will turn off the MOSFET F1, thereby interrupting the current provided by the load 304 to the inductor L1, which may continue to supply a diminishing level of current to the battery 302, with the current flowing through the freewheel diode D2 and the resistor R3. When the current through the inductor L1 is sufficiently low, the voltage V1 across the resistor R3 may fall below the reference voltage REF1. In response, the gate driver GD1 may turn on the MOSFET F1, thereby supplying current from the load 304 to the battery 302.

When the voltage across battery 302 exceeds the voltage across the load 304, diode D3 may permit the battery 302 to charge the load 304, and diode D1 may prevent the current from entering the charge current limiter 306.

Figure 4:
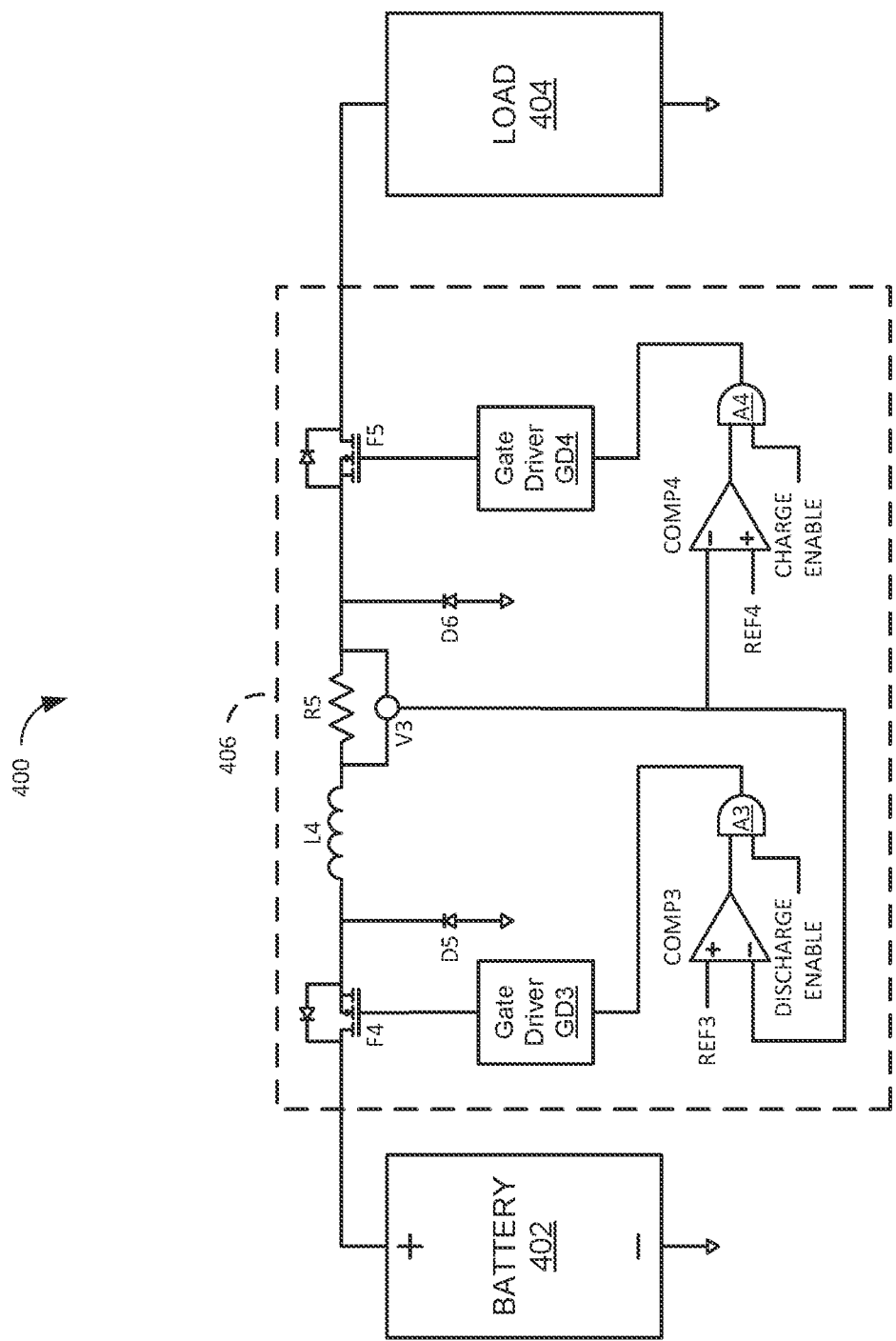
FIG. 4 is a circuit block diagram of a system for limiting inrush and outrush currents for a battery during battery charge and discharge according to some embodiments of the disclosed technologies.

FIG. 4 is a circuit block diagram of a system 400 for limiting inrush and outrush currents for a battery during battery charge and discharge according to some embodiments of the disclosed technologies. Referring to FIG. 4, the system 400 may include a battery 402, a load 404, and a charge current limiter 406 electrically coupled between a positive terminal of the battery 402 and the load 404. The discharge current limiter 406 may include a switch F4, an inductor L4, a resistor R5, and a switch F5, electrically coupled in series.

In the depicted embodiment, the switches F4 and F5 are implemented as MOSFETs. The MOSFETs F4 and F5 may be implemented as NMOS with the body terminal tied to the source to avoid large transient voltages. The MOSFETs F4 and F5 may be implemented as silicon carbide, gallium nitride, or similar materials. Other circuits may be used to implement the switches, for example as described above with reference to FIG. 2. The gates of the MOSFETs F4 and F5 may be driven by gate drivers GD3 and GD4, respectively.

A first freewheel diode D5 may be electrically coupled between ground and a node between the MOSFET F4 and the inductor L4. A second freewheel diode D6 may be electrically coupled between ground and a node between the MOSFET F5 and the resistor R5.

First, an operation of the system 400 for limiting inrush current for the battery 402 during battery charge is described. A voltage sensor V3 may sense a voltage across the resistor R5. A comparator COMP3 may compare that voltage V3 with a reference voltage REF3. The comparator COMP3 may output a logic high when the voltage V3 is less than the reference voltage REF3, and a logic low otherwise. An AND gate A3 may trigger the gate driver GD3 to drive the gate of the MOSFET F4 when voltage V3 is less than the reference voltage REF3 and an enable signal DISCHARGE ENABLE is asserted, thereby turning the switch MOSFET F4 on.

When a current flowing across the inductor L4 to the battery 402 is too high, the voltage V3 across the sense resistor R5 may exceed the reference voltage REF3, and the gate driver GD3 may turn off the MOSFET F4, thereby interrupting the current provided by the battery 402 to the inductor L4, which may continue to supply a diminishing level of current to the load 404, with the current flowing through the freewheel diode D5 and the resistor R5. When the current through the inductor L4 is sufficiently low, the voltage V3 across the resistor R5 may fall below the reference voltage REF3. In response, the gate driver GD3 may turn on the MOSFET F4, again supplying current from the battery 402 to the load 404.

Now, an operation of the system 400 for limiting outrush current from the battery 402 during battery discharge is described. A comparator COMP4 may compare that voltage V3 with a reference voltage REF4. The comparator COMP4 may output a logic high when the voltage V3 is less than the reference voltage REF4, and a logic low otherwise. An AND gate A4 may trigger the gate driver GD4 to drive the gate of the MOSFET F5 when voltage V3 is less than the reference voltage REF4 and an enable signal CHARGE ENABLE is asserted, thereby turning the switch MOSFET F5 on.

When a current flowing across the inductor L4 to the battery 402 is too high, the voltage V3 across the sense resistor R5 may exceed the reference voltage REF4, and the gate driver GD4 may turn off the MOSFET F5, thereby interrupting the current provided by the load 404 to the inductor L4, which may continue to supply a diminishing level of current to the battery 402, with the current flowing through the freewheel diode D6 and the resistor R5. When the current through the inductor L4 is sufficiently low, the voltage V3 across the resistor R5 may fall below the reference voltage REF4. In response, the gate driver GD4 may turn on the MOSFET F5, thereby supplying current from the load 404 to the battery 402.

Advantageously, in the described embodiments the inductance of the inductor, together with the resistance of the battery, may form a low-pass filter that further reduces ripple in whichever direction the current is flowing. Therefore, even a step change in load may result in a slow change in current. The timing of the switches may be used to determine how strong a low-pass filter is needed to achieve a desired ripple current that can be measured as a hysteretic effect. The switches may modulate the signal without overloading the switches.

Figure 5:
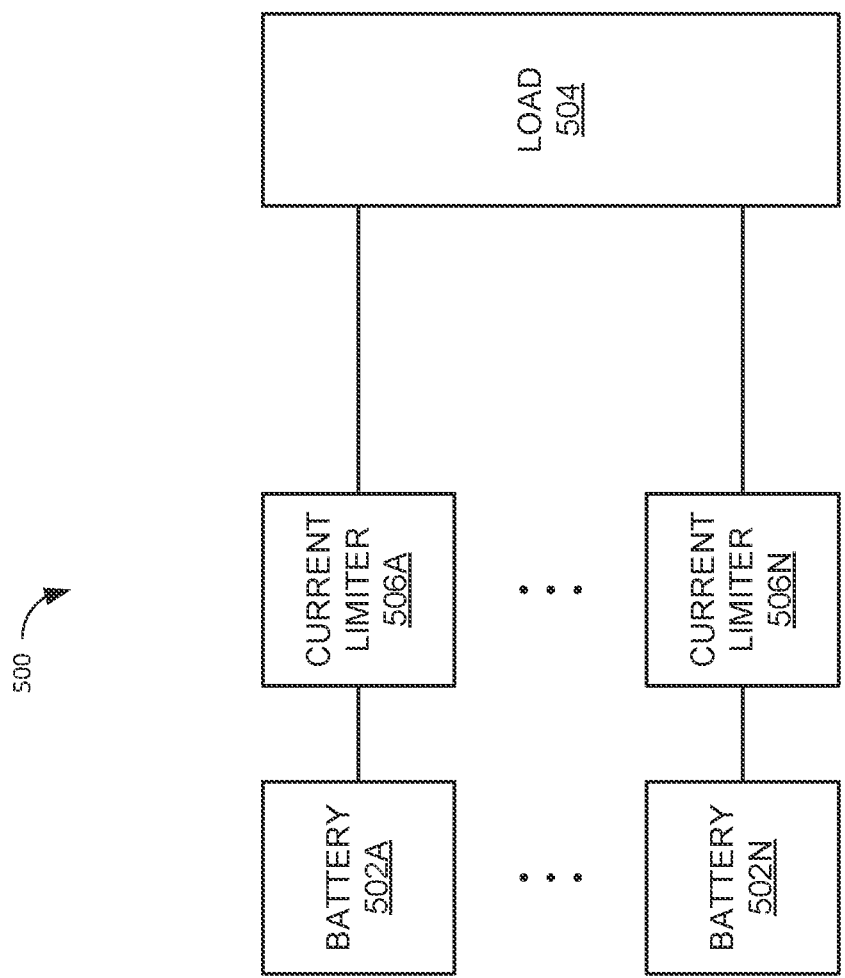
FIG. 5 is a block diagram of a system where multiple current limiters connect multiple batteries to a single load according to some embodiments of the disclosed technologies.

The disclosed current limiters may be used in parallel so multiple batteries may be connected to a single load. FIG. 5 is a block diagram of a system 500 where multiple current limiters connect multiple batteries to a single load according to some embodiments of the disclosed technologies. Referring to FIG. 5, N batteries 502A-N may be connected to a single load 504 by N respective current limiters 506A-N. Each of the current limiters may be implemented as one of the current limiters 206, 306, and 406 described above. Without the current limiters 506, the batteries 502 may be subject to high and dangerous inrush and outrush currents. For example, if one battery is at 800V while the other batteries are at 600V, the 800V battery may dump as much current as possible into the other batteries, on the order of hundreds of amps, which may blow a fuse or otherwise take the system 500 offline.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. An apparatus, comprising:
   a battery;
   a resistive load;
   a switch comprising a first transistor and a second transistor;
   a resistor;
   an inductor; and
   a control circuit;
   wherein the switch, the resistor, and the inductor are electrically coupled in series between the battery and the resistive load; and
   wherein the control circuit controls the switch based on a voltage across the resistor.

2. The apparatus of claim 1, wherein:
   the first transistor is a first MOSFET; and
   the second transistor is a second MOSFET.

3. The apparatus of claim 2, wherein:
   wherein a drain of the first MOSFET is electrically coupled to a drain of the second MOSFET;
   a gate of the first MOSFET is electrically coupled to a gate of the second MOSFET; and
   the gates of the first and second MOSFETs are electrically coupled to an output of the control circuit.

4. The apparatus of claim 1, wherein:
   the control circuit opens the switch when the voltage across the resistor exceeds a predetermined reference voltage; and
   the control circuit closes the switch when the voltage across the resistor does not exceed the predetermined reference voltage.

5. The apparatus of claim 1, wherein:
   the control circuit opens the switch when the voltage across the resistor exceeds a predetermined reference voltage and an enable signal is asserted; and
   the control circuit closes the switch when the voltage across the resistor does not exceed the predetermined reference voltage and the enable signal is asserted.

6. The apparatus of claim 1, further comprising:
   a diode having an input electrically coupled to ground and an output electrically coupled to a node between the switch and the inductor.

7. An apparatus, comprising:
   a battery;
   a resistive load;
   a switch;
   a resistor;
   an inductor; and
   a control circuit;
   wherein the switch, the resistor, and the inductor are electrically coupled in series between the battery and the resistive load; and
   wherein the control circuit controls the switch based on a voltage across the resistor.

8. The apparatus of claim 7, wherein:
   the first transistor is a first MOSFET; and
   the second transistor is a second MOSFET.

9. The apparatus of claim 8, wherein:
   a gate of the MOSFET is electrically coupled to an output of the control circuit.

10. The apparatus of claim 7, wherein:
the control circuit opens the switch when the voltage across the resistor exceeds a predetermined reference voltage; and
the control circuit closes the switch when the voltage across the resistor does not exceed the predetermined reference voltage.

11. The apparatus of claim 7, wherein:
the control circuit opens the switch when the voltage across the resistor exceeds a predetermined reference voltage and an enable signal is asserted; and
the control circuit closes the switch when the voltage across the resistor does not exceed the predetermined reference voltage and the enable signal is asserted.

12. The apparatus of claim 7, further comprising:
a diode having an input electrically coupled to ground and an output electrically coupled to a node between the switch and the inductor.

13. An apparatus, comprising:
a battery;
a resistive load;
a first switch;
a second switch;
a resistor;
an inductor; and
a control circuit;
wherein the first and second switches, the resistor, and the inductor are electrically coupled in series between the battery and the resistive load;
wherein the resistor and the inductor are electrically coupled in series between the first and second switches; and
wherein the control circuit controls the first and second switches based on a voltage across the resistor.

14. The apparatus of claim 13, wherein:
the first switch is a first MOSFET; and
the second switch is a second MOSFET.

15. The apparatus of claim 14, wherein:
a gate of the first MOSFET is electrically coupled to a first output of the control circuit; and
a gate of the second MOSFET is electrically coupled to a second output of the control circuit.

16. The apparatus of claim 13, wherein:
the control circuit opens the first switch when the voltage across the resistor exceeds a predetermined reference voltage; and
the control circuit closes the first switch when the voltage across the resistor does not exceed the predetermined reference voltage.

17. The apparatus of claim 13, wherein:
the control circuit opens the first switch when the voltage across the resistor exceeds a predetermined reference voltage and a discharge enable signal is asserted; and
the control circuit closes the first switch when the voltage across the resistor does not exceed the predetermined reference voltage and a discharge enable signal is negated.

18. The apparatus of claim 13, wherein:
the control circuit opens the second switch when the voltage across the resistor exceeds a predetermined reference voltage; and
the control circuit closes the second switch when the voltage across the resistor does not exceed the predetermined reference voltage.

19. The apparatus of claim 13, wherein:
the control circuit opens the second switch when the voltage across the resistor exceeds a predetermined reference voltage and a discharge enable signal is asserted; and
the control circuit closes the second switch when the voltage across the resistor does not exceed the predetermined reference voltage and a discharge enable signal is negated.

20. The apparatus of claim 13, further comprising:
a first diode having an input electrically coupled to ground and an output electrically coupled to a node between the first switch and the inductor; and
a second diode having an input electrically coupled to ground and an output electrically coupled to a node between the second switch and the inductor.

* * * * *